July 24, 1934.  A. SOLLER  1,967,483
INSTRUMENT MOUNTING
Filed April 1, 1933
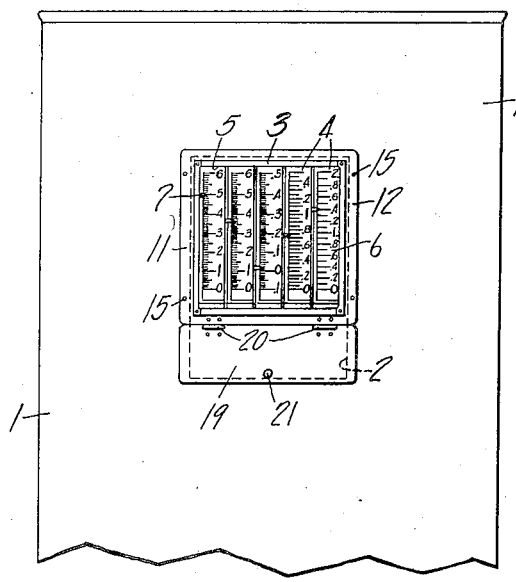
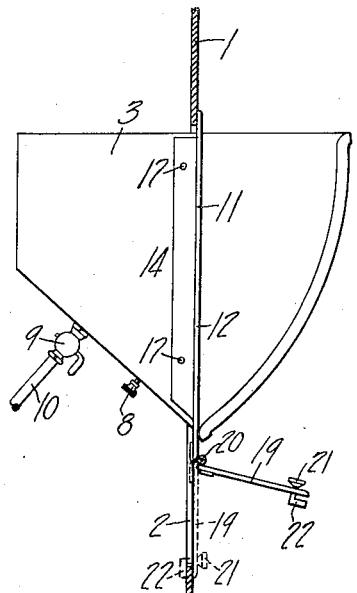
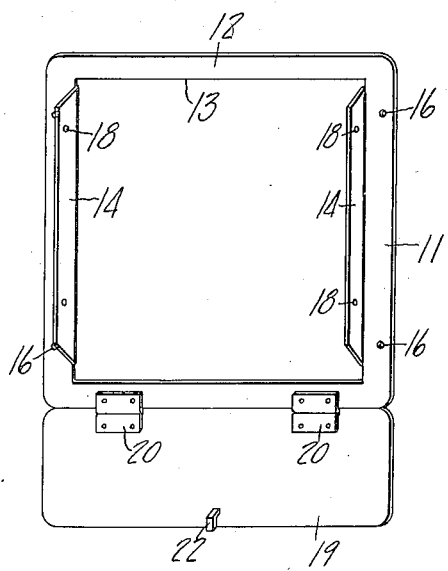
INVENTOR.
Arnold Soller.
BY
ATTORNEY.

Patented July 24, 1934

1,967,483

UNITED STATES PATENT OFFICE 1,967,483

INSTRUMENT MOUNTING

Arnold Soller, Michigan City, Ind., assignor to The Hays Corporation, Michigan City, Ind.

Application April 1, 1933, Serial No. 663,890

3 Claims. (Cl. 248—30)

The invention relates to instrument mountings, and particularly to mountings by which instruments, such as draft and pressure gages, may be mounted upon an instrument panel.

Panel mounted instruments frequently require adjustment, as, for instance, zero adjustments involving repositioning of the shiftable indicating portion of the gage to normal or correct zero indicating position after the same has become misadjusted in use. The practice heretofore followed in the mounting of instruments on panels have made accurate adjustments of the instruments by a single individual almost impossible, because an individual could not reach the adjusting mechanism of the instrument while maintaining a position to view the face of the instrument. It has therefore been necessary to have two persons cooperate in making the adjustment, one to perform the actual adjusting operation while standing behind the panel or in reach of the instrument adjusting mechanism, and the other to watch the face of the instrument and direct the first.

It is therefore the primary object of my invention to provide a mounting by which an instrument may be mounted on a panel in a manner whereby the adjusting mechanism of the instrument is accessible to a person standing in front of the panel in a position to view the face of the instrument.

A further object of the invention is to provide an instrument panel with an opening larger than the instrument which it is to receive, and to mount said instrument on the panel by a mounting provided with a shiftable member normally closing the portion of the opening not occupied by the instrument.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a fragmentary front elevation of an instrument panel in which an instrument is mounted by my improved mounting.

Figure 2 is a vertical sectional view of an instrument panel illustrating the instrument and mounting in side elevation.

Figure 3 is a perspective view of my improved instrument mounting viewed from the back thereof.

Referring to the drawing, which illustrates the preferred embodiment of the invention, the numeral 1 designates an instrument panel having an opening 2 formed therein for the reception of the casing 3 of the instrument to be mounted on the panel. The instrument may be of any desired type, such as a draft gage, pressure gage, or the like, and the casing 3 may be constructed to contain one or more of these instruments, five instruments being mounted in the casing as shown in the drawing. The instrument casing 3 is provided with a sight opening 5 through which the dial or face 6, and the pointer 7, of the instrument or instruments may be viewed. The instrument adjusting mechanism 8, such as the zero adjustment, and the valve 9 controlling the connection 10 of the instrument with the apparatus (not shown) whose characteristics are to be measured by the instrument, project from the casing 3.

The instrument casing 3 is mounted on the panel 1 by a mounting 11 which comprises a plate 12 having an opening 13 therein into which the instrument casing 3 closely fits. A pair of flanges 14 extend perpendicularly rearwardly from the plate 11 at opposite sides thereof and adjacent opening 13. The plate 11 is of a size to cover only a portion of the panel opening 2, and is secured to the panel by suitable means 15, such as bolts, which extend through openings 16 formed therein. The instrument casing 3 is mounted on the mounting 11 by securing means 17 which pass through openings 18 formed in the flanges 14.

A plate 19 is secured to the plate 12 at the lower edge thereof by means of hinges 20, and this plate normally closes the remainder of opening 2 in panel 1. A suitable knob 21 is rotatably carried by plate 19 at the front thereof and actuates a catch 22 positioned at the rear of said plate in a manner to selectively engage the edge of panel 1 at the opening 2 thereof to lock said plate 19 in closed position.

It will thus be seen that a two-part mounting for instruments is provided, one part of which is fixedly secured to the panel and securely mounts the instrument casing 3, and the other part of which is hinged to the first. The hinged plate 19 is normally held in effective position to close panel opening 2 by the catch 22, but may be readily pivoted relative to the panel upon release of the catch 22 by the knob 21. When the plate 19 has been pivoted to the position shown in full lines in Figure 2, the lower portion of panel opening 2 is exposed. An individual standing in front of panel 1 in a position to clearly view dial 6 and pointer 7 of the instrument or instruments 4 may then, without changing his position, reach through the exposed portion of panel opening 2 to the instrument adjusting means 8 or the instrument valve 9 to actuate the same.

It will be understood that, while the hinged plate 19 is illustrated in a position below instrument mounting plate 12, the position thereof may be changed to a side or the top of the instrument plate as may be desirable or necessary, in any case, as where the adjusting and like means of the instrument are disposed at a side or the top of the instrument casing 3.

The invention having been set forth, what is claimed as new and useful is:

1. Means for mounting an instrument on a panel comprising a plate mountable on said panel and having an opening therein for the reception of the instrument, a flange projecting angularly of said plate adjacent said opening to which said instrument is secured, a second plate, and a hinge mounting said second plate adjacent an edge of said first plate.

2. Means for mounting an instrument on a panel comprising a plate mountable on said panel and having an opening therein for the reception of the instrument, a flange projecting angularly of said plate adjacent said opening to which said instrument is secured, a second plate, and means shiftably securing said second plate to said first plate.

3. Means for mounting an instrument in an instrument receiving opening of an instrument panel comprising a plate mountable on the panel to close a portion of said panel opening and having an instrument receiving opening, means securing the instrument in said plate opening, a second plate for closing the remainder of said panel opening, and means shiftably securing said second plate to said first plate.

ARNOLD SOLLER.